United States Patent

[11] 3,605,032

[72] Inventor William J. Kerwin
Sunnyvale, Calif.
[21] Appl. No. 31,885
[22] Filed May 4, 1970
[45] Patented Sept. 14, 1971
[73] Assignee The United States of America as represented by the Administrator of the National Aeronautics and Space Administration
Continuation-in-part of application Ser. No. 714,295, Mar. 19, 1968, now abandoned.

[54] ACTIVE RC NETWORKS

7 Claims, 11 Drawing Figs.

[52] U.S. Cl. .... 330/107, 330/26, 330/31, 330/94, 330/109
[51] Int. Cl. .... H03f 1/36
[50] Field of Search .... 330/21, 26, 31, 38, 38 N, 94, 107, 109; 331/135-137, 140; 333/70 R

[56] References Cited

UNITED STATES PATENTS

| | | | |
|---|---|---|---|
| 3,473,141 | 10/1969 | Fjallbrant | 330/107 X |
| 3,389,349 | 6/1968 | Troost et al | 330/38 X |

OTHER REFERENCES

Sallen et al, " A Practical Method of Designing RC Active Filters," IRE Transactions-Circuit Theory March 1955 pp. 74–85 333-70 R

*Primary Examiner*—Roy Lake
*Assistant Examiner*—James B. Mullins
*Attorneys*—Darrell G. Brekke and G. T. McCoy

ABSTRACT: An active RC network formed by a voltage amplifier, a passive RC input circuit for the amplifier which circuit includes a distributed RC element, and a provision for positive feedback from the output of the amplifier to the input circuit. In one embodiment, a lumped capacitor is connected in shunt with the voltage amplifier whereby a pole of the network transfer function can be located at any desired position farther from the origin than a zero of the function. Another embodiment includes a lumped resistor, which is connected in shunt with the voltage amplifier, whereby a pole can be located at any desired position closer to the origin than the zero. In another embodiment, a pole is located simply by proper selection of the amplifier gain and the parameters of the distributed element; also the amplifier gain is always less than unity in this embodiment so that a very simple oscillator may be provided by location of the pole on the imaginary axis of the impedance plane. Still further embodiments provide for the distributed element to be advantageously divided into a plurality of sections. In view of the reduced gain requirements of the networks of this invention, the voltage amplifier may in many cases be a simple emitter follower, and an example of a network with such an amplifier is described. The networks may be connected in cascade to contribute separate factors in an overall response, and an example of the use of such cascaded networks to obtain a low-pass filter response is described.

INVENTOR.
WILLIAM J. KERWIN
BY [signature]
[signature]
ATTORNEY

INVENTOR.
WILLIAM J. KERWIN

BY [signature]

[signature]
ATTORNEY

ACTIVE RC NETWORKS

This application is a continuation of Ser. No. 714,295 filed Mar. 19, 1968, now abandoned.

The invention described herein was made by an employee of the U.S. Government and may be manufactured and used by or for the Government for Governmental purposes without the payment of any royalties thereon or therefor.

BACKGROUND OF THE INVENTION

An active RC network may be defined as a circuit containing resistors, capacitors and an active element, such as an amplifier, which interact to provide a characteristic transfer function for relating the output of the circuit to the input of the circuit. It is most significant that such networks are able to achieve the same transfer functions as passive RLC networks, but without the necessity of including inductance in the circuit. The elimination of inductive components from the circuit has many advantages. If the circuit is manufactured in the form of an integrated or monolithic circuit, it is not practical to provide inductive elements. For many applications, the size and weight of inductive components are undesirable. And in applications such as the measurement of weak magnetic fields, the magnetic effects of inductive elements are undesirable.

One object of the present invention is the provision of a new form of active RC network.

Another object of the present invention is the provision of an active RC network with independently adjustable poles and zeros.

Another object of the present invention is the provision of an active RC network in which stages may be connected in cascade in order to simulate a given transfer function.

Another object of the present invention is the provision of an active RC network of simpler design, improved reliability, and lower sensitivity-to-component and amplifier gain tolerances.

One previous form of active RC network, described in the article by W. J. Kerwin entitled "An RC Active Elliptic Function Filter," published in the 1966 IEEE Region Six Conference Record, Vol. 2, Apr. 1966, pages 648–654, is advantageous in that the active element is a relatively simple voltage-controlled voltage-source (DC voltage amplifier). However, this simplification is accompanied by the disadvantage of using a relatively large number of passive elements in the circuit.

Accordingly, a more specific object of the present invention is the provision of an active RC network in which both the active and passive components are of simple design.

Still another object of the present invention is the provision of an active RC network of decreased circuit size.

SUMMARY OF THE INVENTION

Generally speaking, the present invention attains these objects by the provision of an active RC network, comprising: a voltage amplifier; a passive RC input circuit for said voltage amplifier, said input circuit comprising a distributed RC element; and means for feeding back a signal from the output of said voltage amplifier to said input circuit.

DESCRIPTION OF DRAWING

These and other objects, advantages and features of the present invention will become more apparent upon a consideration of the following specification, taken in connection with the accompany drawing, wherein.

DESCRIPTION OF THE PREFERRED EMBODIMENTS

Figures 1, 2, 3, 4, 5:
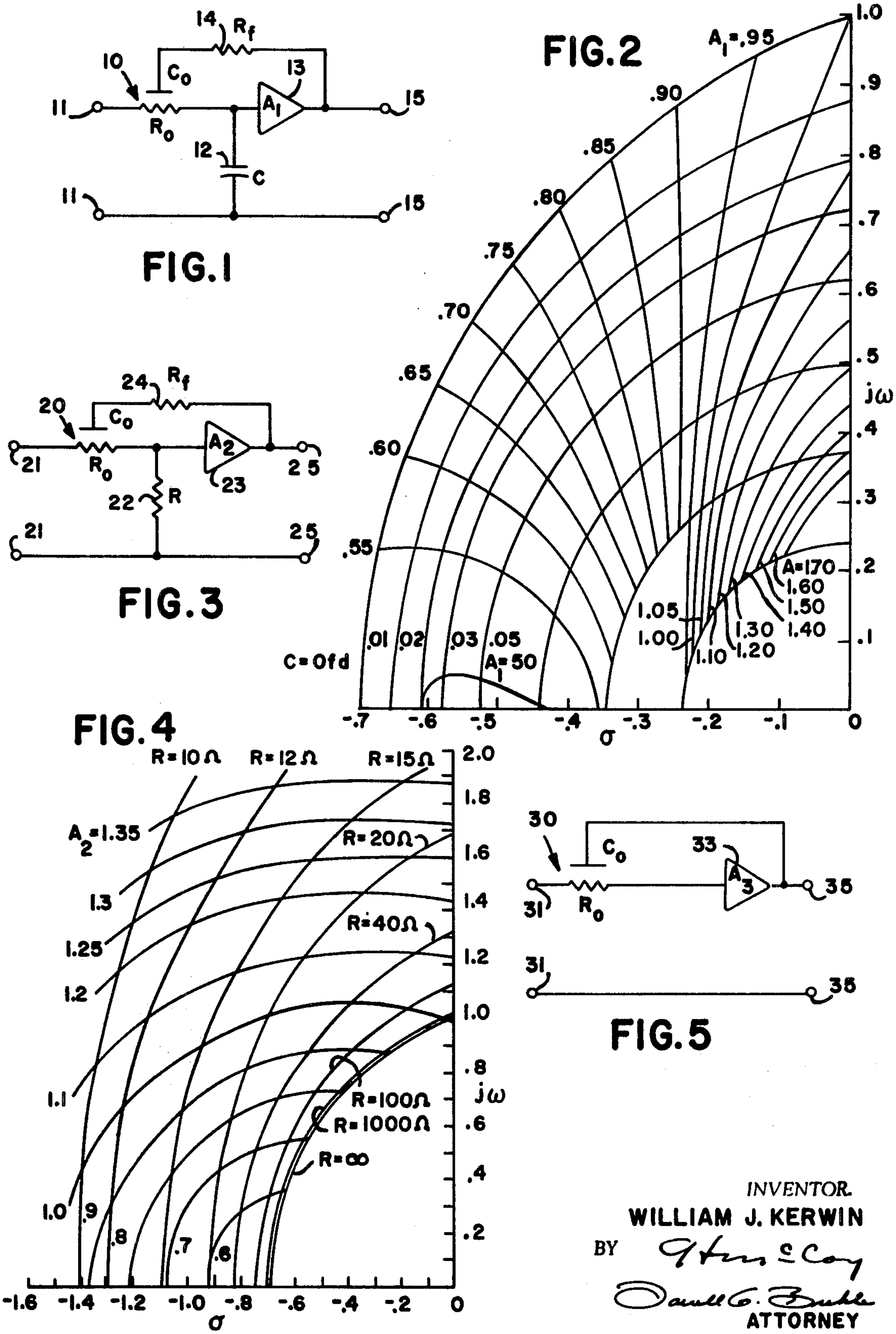
FIG. 1 is a schematic circuit diagram of an active RC network in accordance with the present invention.
FIG. 2 is a plot of the pole positions of the network of FIG. 1 as a function of certain circuit parameters.
FIG. 3 is a schematic circuit diagram of another form of active RC network in accordance with the present invention.
FIG 4 is a plot of the pole positions of the network of FIG. 3 as a function of certain circuit parameters.
FIG. 5 is a schematic circuit diagram of another form of the active RC network in accordance with the present invention.

"Ordinary functions of a single real variable such as sine, cosine, tangent, exponential, hyperbolic functions, or polynomials, and products, quotients, and sums of these functions, can be converted to functions of a complex variable through the simple expedient of replacing the real variable $x$ with a complex variable $p=\sigma+j\omega$. All of the functions in a complex variable obtained in this manner are called analytic functions because they have derivatives independent of direction on the $p$ plane which are bounded in magnitude everywhere except at the exact positions of the singularities of the function. In addition to a constant multiplier, analytic functions are completely defined by the values of the complex variable at which the function becomes zero and infinite, The values of $p$ at which the function becomes zero are the zeros of the function $z_i$, and the valves of $p$ at which the function becomes infinite are the singularities (usually the poles) of the function $p_i$." Circuit Theory and Design, by John L. Stewart, John Wiley & Sons, Inc., 1956, pages 57 and 58. The transfer function of a network may be expressed as the ratio of two polynomials in $p$ having real coefficients. The roots of the numerator are defined as zeros and the roots of the denominator are defined as poles. See supra at page 82 and Network Analysis and Synthesis, Second Edition, Franklin F. Kuo, John Wiley & Sons, Inc., 1966, page 155.

Typical pole-zero plots of low-pass, high-pass, band-pass and band-elimination transfer functions are depicted in Chapter 3, The Poles and Zeros of Networks, Circuit Theory and Design, John L. Stewart, John Wiley & Sons, Inc., 1956.

Numerous authors have laboriously and meticulously determined the transfer functions necessary to produce enumerable low-pass, high-pass, band-pass, and band-elimination filters (with every conceivable slope). In addition, they have solved the roots in the numerator and denominator of these transfer functions so that one can immediately tell where to place the poles and zeros to achieve the desired result. An example of one such text is Design Theory and Data for Electrical Filters, J. K. Skwirzynski, D. Van Nostrand and Co., London, 1965.

The usual approach to the design of active RC networks is to consider a general transfer function $T(p)$ relating the output of the network to the input of the network, where $p$ is the complex frequency variable $\sigma+j\omega$, as being factored into a product of complex root quadratics and first degree terms. Each quadratic factor is realized by an active RC network, and the first degree term or terms are realized by a passive RC network. The desired overall response $T(p)$ is then realized by connecting these individual subnetworks in cascade.

The quadratic factor associated with each active RC network will, in general, be characterized by a set of complex conjugate poles and a set of complex conjugate zeros in the complex $p$ plane. Such response is known as a quadratic or second-order response. However, it is only the pole and zero located in the upper left quadrant of the plane (including the axes thereof) that are of physical significance. The zero, however, may be located in the upper right quadrant as well. The frequency response of the network is given by the profile of the function T($p$) along the $+j\omega$ axis. In general, the existence of a pole at a point $p_n=-\sigma_n+j\omega_n$ indicates a maximum response in the vicinity of the frequency $\omega_n$ with a with the sharpness or Q of this response varying directly with the size of the real component $-\sigma_n$. If $\sigma_n=0$, the pole lies on the $j\omega$ axis and indicates a condition of oscillation at $\omega_n$. Similarily, the existence of the zero at a point $p_m=-\sigma_m+j\omega_m$ indicates a minimum response in the vicinity of the frequency $\omega_m$. Usually, it is most convenient to consider subnetworks in which a zero lies on the $j\omega$ axis ($\sigma_m=0$), in which case there is total rejection at the frequency $\omega_m$. By independently establishing the poles and zeros in successive networks connected in cascade, it is then possible to simulate the function T($p$), corresponding to a desired frequency response along the $j\omega$ axis, to any desired degree of accuracy.

FIG. 1 illustrates an active RC network for independently obtaining a pair of complex conjugate poles and a pair of complex conjugate zeros in accordance with the present invention. The numeral 10 represents a distributed RC line or element such as is disclosed, for example, in the article by D. G. Barker entitled "Synthesis of Active Filters Employing Thin Film Distributed Parameter Networks" published in the IEEE International Convention Record, Part 7, 1965, pages 119–126 and an article by B. B. Woo and R. G. Hove entitled "Synthesis of Rational Transfer Functions with Thin Film Distributed-Parameter RC Active Networks" published in the Proceedings of the National Electronics Conference, Vol. XXI, 1965, pages 270–274. Such elements usually consist of a dielectric layer sandwiched between a resistive layer and a high conductivity layer. The line 10 may have either a uniform or a variable resistance per unit length and it may have either a uniform or a variable capacitance per unit length. The resistive part of the distributed RC elements 10 is connected in series with network input terminals 11, and a lumped capacitor 12 is connected in shunt with the input terminals 11. These elements 10 and 12 form a passive input circuit for a voltage amplifier 13, said amplifier having a positive gain $A_1$. Part of the output signal of the voltage amplifier 13 is coupled through a feedback resistor 14 to the conducting film of the capacitive part of the distributed RC element 10, to thereby generate positive feedback for the amplifier 13. The output of the amplifier 13 provides the output signal for output terminals 15 of the active RC network.

As used herein, the term "voltage amplifier" means an active element producing an output voltage related by a constant to the input voltage. The term is used to include active elements having a voltage gain equal to, more than, or less than unity.

For purposes of further analysis, the zeros of the network of FIG. 1 will be taken as located on the $j\omega$ axis at normalized frequencies $\omega=\pm1.0$ r.p.s., and the feedback resistance $R_f$ of the resistor 14 will be normalized at 1.0. For a uniform distributed element 10, this requires a distributed resistance $R_o$ of 17.786 Ω and a distributed capacitance $C_o$ of 0.629 fd. The poles of the network can then be located by proper selection of the value of the gain $A_1$ of the voltage amplifier 13 and of the capacitance C of the shunt capacitor 12. By matching the amplitude response of the circuit of FIG. 1 to that of a rational 2-pole, 2-$j\omega$ axis zero function in a sufficient number of cases, the equivalent pole positions of the network can be plotted on the complex $p=\sigma+j\omega$ plane as a function of the network parameters $A_1$ and C. The upper left-hand quadrant of such a plot for values of $A_1$ from 0.5 to 1.7 and of C from 0 to 0.5 fd. is shown in FIG. 2. As previously indicated, the zeros are located at $\omega=1.0$ r.p.s. for all values of $A_1$ and C. The curves in FIG. 2 are loci of constant gain $A_1$ and constant capacity C. The intersection of the $A_1$ and C lines give the pole position for these particular values of $A_1$ and C. For example, a pole at $-0.2+j\,0.3$ (and also at the complex conjugate position $-0.2-j\,0.3$ not shown in FIG. 2) is produced when $A_1=1.05$ and $C=0.2$ fd. In order to synthesize a network for a given pole-zero position, the pole position is transformed so that the $j\omega$ axis zeros are located at $\omega=\pm1$, and the required values of $A_1$ and C obtained by interpolation from the curves intersecting in the vicinity of the transformed pole.

To illustrate the use of the plot of FIG. 2 in selecting the parameters of the network of FIG. 1 for a desired transfer function, consider a 3-pole, 2-$j\omega$ axis zero maximally flat low-pass filter (normalized to −3 db. at $\omega=1$) whose voltage transfer function T($p$) is:

$$T(p)=\frac{0.333(p^2+4)}{(p^2+0.89p+1.09)(p+1.22)}$$

The quadratic response to be realized by the network of FIG. 1 is:

$$\frac{V_2}{V_1}=\frac{p^2+4}{p_2+0.89p+1.09}$$

where $V_1$ is the input voltage across the input terminals 11, and $V_2$ is the output voltage across the output terminals 12. The first order response $1.22/p+1.22$ is readily obtained by connecting a passive RC network in cascade with the network of FIG. 1. In order to place the zeros of the quadratic response at $\omega=\pm1$, the substitution $p=2s$ is made, thereby obtaining the function:

$$\frac{V_2}{V_1}=\frac{4(s^2+1)}{4s^2+1.78s+1.09}$$

The transformed poles (values of $s$ for which the denominator is zero) are thus given by $s=-0.22\pm j\,0.47$. The pole point $\sigma=-0.22$, $\omega=0.47$ is then located in FIG. 2, and the interpolated curves intersecting at this point give the values $A_1=0.94$ and $C=0.080$ fd. To obtain the desired transfer function, recalling that $p=2s$, the network must be frequency scaled by a factor of two, thereby dividing the capacities $C_o$ and $C$ of the capacitive elements by a factor of two. The final result for the parameters of the network of FIG. 1 for this example is then:

$R_f=1.00$ Ω,
$C_o=0.314$ fd,
$R_o=17.8$ Ω,
$C=0.040$ fd, and
$A_1=0.94$.

The usual frequency and impedance scaling can be applied to this set of normalized parameters in order to obtain the desired element sizes and cutoff frequency. It should be noted that the amplifier 13 in the network of FIG. 1 provides sufficient isolation that an independent impedance scaling can be applied to any network connected in cascade therewith. This property may be conveniently used to minimize the spread in the value of the circuit elements used throughout the entire filter.

FIG. 3 illustrates another form of active RC network for independently obtaining a pair of complex conjugate poles and a pair of complex conjugate zeros in accordance with the present invention. The numeral 20 represents a distributed RC line or element of the type described above with reference to numeral 10 in FIG. 1. The resistive part of the distributed RC element 20 is connected in series with network input terminals 21, and a lumped resistor 22 is connected in shunt with the input terminals 21. The elements 20 and 22 form a passive input circuit for a voltage amplifier 23, said amplifier having a positive gain $A_2$. Part of the output of the voltage amplifier 23 is coupled through a feeding back resistor 24 to the conducting film of the capacitive part of the distributed RC element 20, to thereby generate positive feedback for the amplifier 23. The output of the amplifier 23 provides the output signal for output terminals 25 of the active RC network.

Again, for purposes of analysis, the zeros of the network of FIG. 3 will be taken as located on the $j\omega$ axis at normalized frequencies $\omega=\pm1.0$ r.p.s., and the feedback resistance of the resistor 24 will be normalized at 1.0 Ω so that, for a uniform distributed element 20, the distributed resistance $R_o$ is 17.786 Ω and the distributed capacitance $C_o$ is 0.629 fd. The poles are then located by proper selection of the value of the gain $A_2$ of the voltage amplifier 23 and the resistance R of the shunt resistor 22. By matching the amplitude response of the network of FIG. 3 to a rational function, the equivalent pole positions can be plotted as a function of the network parameters $A_2$ and R. The upper left-hand quadrant of such a plot for values of $A_2$ from 0.6 to 1.35 and values of R from 10 Ω to 1000 Ω is shown The FIG. 4 The curve for *R*=∞ *is also shown, this curve corresponding to the curve for C*=0 in FIG. 2.

To illustrate the use of the plot of FIG. 4 in selecting the parameters of the network of FIG. 3 for a desired transfer function, consider a 3-pole, 2-$j\omega$ axis zero maximally flat high-pass function (−3 db. at $\omega=\pm1$, zeros at $\omega=\pm0.5$) whose voltage transfer function T(*p*) is:

$$\frac{V_2}{V_1}=T(p)=\frac{p(p^2+0.25)}{(p^2+0.82p+0.92)(p+0.82)}$$

The quadratic response to be realized by the network of FIG. 3 is:

$$\frac{V_2}{V_1}=\frac{p^2+0.25}{p^2+0.82p+0.92}$$

where $V_1$ is the input voltage, across the input terminals 21, and $V_2$ is the output voltage across the output terminals 22. The first order response $p/p+0.82$ is readily obtained by connecting a passive RC network in cascade with the network of FIG. 3. In order to place the zeros of the quadratic response at $\omega=\pm1$, the substitution $p=0.5s$ is made, thereby obtaining the function:

$$\frac{V_2}{V_1}=\frac{0.25(s^2+1)}{0.25s^2+0.41s+0.92}$$

The pole $\sigma=-0.82$, $\omega=1.73$ is then located in FIG. 3, and the interpolated curves intersecting at this point give the values $A_2=1.31$ and $R=11.5$ Ω. To obtain the desired transfer function for the variable *p*, the network must be frequency scaled by a factor of one-half, thereby multiplying the capacity $C_0$ by a factor of two. The final result for the parameters of the network of FIG. 3 for this example is then:

$R_f=1.00$ Ω,
$C_0=1.26$ fd,
$R_0=17.8$ Ω,
$R=11.5$ Ω, and
$A_2=1.31$.

The usual frequency and impedance scaling can then be applied to this set of normalized parameters in order to obtain the desired element sizes and cutoff frequency. Again, it should be noted that the amplifier 23 in the network of FIG. 3 provides sufficient isolation that an independent impedance scaling can be applied to any network connected in cascade therewith.

It should be noted that the network of FIG. 1 can be used to located the poles at a position closer to the origin than the zeros, and that the network of FIG. 3 can be used to locate the poles at a position farther from the origin than the zeros. In general, these two networks can be used for all left-hand plane pole positions, as well as zeros anywhere in the plane. For example, in the normalized examples given above, if the feedback resistance $R_f$ is reduced below 1.0Ω, right-half plane zeros are produced and therefore a simple adjustable 2-pole, 2-zero all-Pass network may be obtained in which the single resistor determines the zero positions and the amplifier gain determines the pole positions. Moreover, parameters may be selected, as seen in FIGS. 2 and 4, which locate a pole on the $j\omega$ axis and thereby produce an oscillator at the frequency $\omega$ at which the pole is located.

Various advantages of the networks of FIGS. 1 and 3 can be appreciated by comparing these networks with previous networks used to obtain the same second-order response as disclosed in the article by W. J. Kerwin cited above. Considering the distributed elements 10 and 20 as consisting of two elements each, the number of elements is reduced by three, with these distributed elements occupying no more area than a single lumped capacitor. Moreover, the required amplifier gain is reduced by approximately one-half, so that simpler amplifier design may be used and improved gain stability is achieved with regard to changes in either the forward path components or the feedback components.

FIG. 5 illustrates a form of active RC network in accordance with the present invention in which the zeros of the transfer function are always located at infinity, so that the amplitude response is equivalent to that of a single pair of complex conjugate poles only. The numeral 30 represents a distributed RC line or element of the type described above with reference to numeral 10 in FIG. 1. The resistive part of the distributed RC element 30 is connected in series with network input terminals 31 and forms a passive input circuit for a voltage amplifier 33, said amplifier having a positive gain $A_3$. Part of the output of the voltage amplifier 33 is connected directly to the conducting film of the distributed RC element 30 which is capacitively coupled to the input of the amplifier 33, to thereby generate positive feedback for the amplifier 33. The output of the amplifier 33 provides the output signal output terminals 35 of the RC network. Normalizing the distributed resistance $R_0$ of the element 30 to 1.0Ω, the poles may be located by the proper selection of the value of the gain $A_3$ of the voltage amplifier 33 and the distributed capacitance $C_0$ of the element 30. By matching the amplitude response of the network of FIG. 5 to a rational function, the equivalent pole positions can be plotted as a function of $A_3$ and $C_0$. The upper left-hand quadrant of such a plot for values of $A_3$ from 0.5 to 0.92 and values of $C_0$ from 10 fd to 30 fd is shown in FIG. 6.

Figure 6:
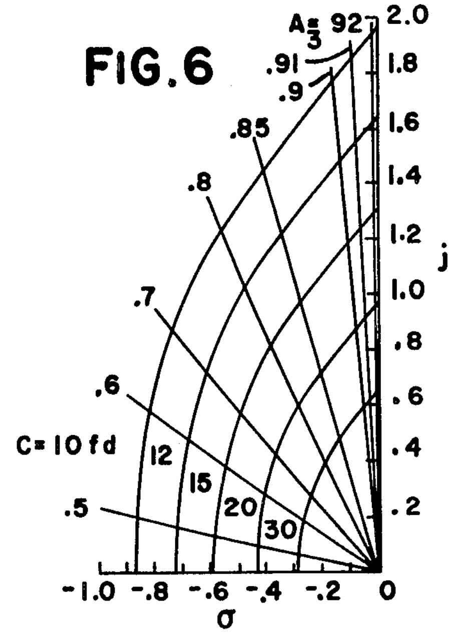
FIG. 6 is a plot of the pole positions of the network of FIG. 5 as a function of certain circuit parameters.

To illustrate the use of the plot of FIG. 6 in selecting the parameters of the network of FIG. 5 for a desired transfer function, consider the function:

$$\frac{V_2}{V_1}=T(p)=\frac{0.616}{p^2+0.3p+0.7}$$

whose poles are at $-0.15\pm j\,0.82$. To realize this two-pole quadratic response in the ratio $V_2/V_1$ of output voltage $V_2$ at terminals 35 to input voltage $V_1$ at terminals 31, the pole $\sigma=0.15$ and $\omega=0.82$ is located in FIG. 6 and the interpolated curves intersecting at this point give values $A_3=0.88$ and $C_0=19.0$ fd.

A previous active RC network used to obtain the same two-pole response as the network of FIG. 5 is described in an article by R. P. Sallen and E. L. Key entitled "A Practical Method of Designing RC Active Filters" published in the IRE Transactions on Circuit Theory, Vol. CT–2, No. 1, Mar. 1955, pages 74–84. This previous network requires a lumped circuit of two resistors and two capacitors which has been replaced by the single RC line 30 in FIG. 5. Moreover, the required amplifier gain is always less than unity, thereby greatly simplifying the design of the voltage amplifier 33 which can be simply a single emitter follower transistor circuit. This network is particularly useful as an oscillator in view of its simplicity. The gain required for oscillation with input grounded in 0.9206 and the frequency of oscillation is determined by the distributed capacitance $C_0$, the oscillation frequency being the frequency at which the curve for the selected value of $C_0$ intersects the $j\omega$ axis in FIG. 6. Another significant advantage of the network of FIG. 5 is that the Q of the response is independent of the parameters $R_0$ and $C_0$ of the distributed line 30.

Referring again to FIG. 2, it can be seen that the majority of pole positions for the network of FIG. 1 are produced with an amplifier gain $A_1$ less than unity. In these cases, It is possible to use an emitter follower rather than a multistage amplifier as the amplifier 13. Such a network, utilizing an emitter follower stage which may be adjusted to any gain less than unity, is shown in FIG. 7.

Figure 7:
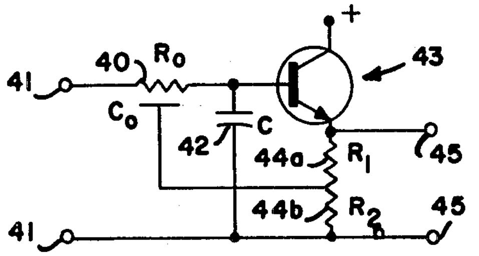
FIG. 7 is a schematic circuit diagram of a network of the type shown in FIG. 1 using a simple emitter follower transistor amplifier.

Referring to FIG. 7, the numeral 40 represents a distributed RC line or element of the type described with reference to numeral 10 in FIG. 1. The distributed RC element 40 is connected in series with network input terminals 41, and a lumped capacitor 42 is connected in shunt with the input terminals 41. These elements 40 and 42 form a passive input circuit for a voltage amplifier comprising a single state emitter follower transistor 43, said amplifier having a positive gain $A_1$ which is less than unity Part of the output signal of the emitter follower transistor 43 is coupled back via a resistive voltage-divider, comprising resistors 44*a* and 44*b* in series with the emitter of the transistor 43, to the conducting film of the distributed RC element 40, to thereby generate positive feedback for the amplifier 43. The output of the amplifier 43 across both of the resistors 44*a* and 44*b* provides the output signal for output terminals 45 of the active RC network. If the total emitter follower source resistance at the junction of the resistors 44*a* and 44*b* is selected to be equal to the denormalized value of $R_f$ in the equivalent circuit of FIG. 1, the following relationship is obtained:

$$Rf=\frac{(R_1+1/g_m)R_2}{R_1+R_2+1/g_m}$$

where $R_1$ is the resistance of the resistor 44*a*, $R_2$ if the resistance of the resistor 44*b*, and $g_m$ is the transconductance of the transistor 43. In addition, the divider ratio is determined by the desired gain $A_1$ of the transistor 43 as follows:

$$A_1=\frac{R_2}{R_1+R_2+1/g_m}$$

Solution of these simultaneous equations gives:

$$R_1=R_f/A_1-1/g_m$$
$$R_2=R_f/(1-A_1)$$

If zero DC offset from input to output is desired, another emitter follower may be used preceding the network of FIG. 7. It should be noted that the simplified amplifier circuit of FIG. 7 is most useful for Q values of 5 or less. For higher Q values, in view of the requirement of higher amplifier gain stability at higher Q, it may be desirable to use the more complex amplifier circuits used with previous active RC networks, for example the amplifier circuit described in the article by W. J. Kerwin and L. P. Huelsman entitled "The Design of High Performance RC Active Band-pass Filters," published in the IRE International Convention Record, Part 10, Mar. 1966, pages 74–80.

Figure 8:
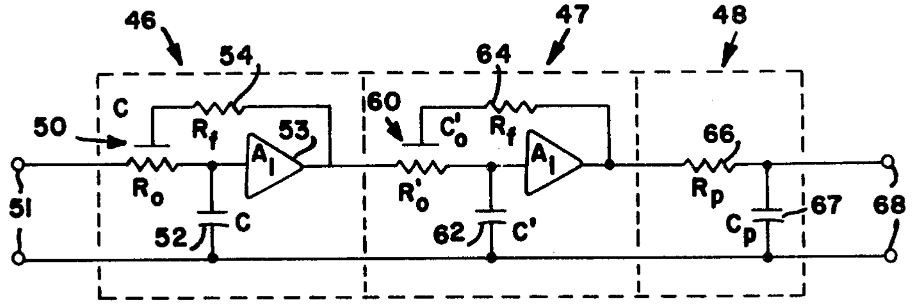
FIG. 8 is a schematic circuit diagram of an active RC network in accordance with the present invention in which three subnetworks are connected in cascade to contribute separate factors in the overall low-pass filter response of the network.

FIG. 8 illustrates a typical filter network obtained by cascading network elements in accordance with the present invention. This is a 5-pole, 4-$j\omega$ axis zero low-pass filter chosen to have an equal ripple pass band with a tolerance of 0.5 db. and an equal ripple stop band with a minimum attenuation of 40 db. A transfer function $I(p)$ which may be used to synthesize this circuit is:

$$\frac{V_2}{V_1}=T(p)=\frac{01.68(0.359p^2+1)(0.738p^2+1)}{(p^2+0.488p+0.501)(p^2+0.114p+0.808)(p+0.416)}$$

This function has a cutoff frequency (−0.5 db.) at$\omega$=0.866 and is 40 db. down at $\omega$=1.13. This function can be split into three factors (neglecting the constant multiplier) and each factor is separately realized by subnetworks 46, 47 and 48, respectively, in FIG. 8. A multiplier of 0.416 is assumed for the third factor to make it realizable with the passive RC network 48. If the resulting overall gain realized thereby is not acceptable, either attenuation or additional gain can be readily added. The network element 46 is of the type described with reference to FIG. 1 and includes a distributed RC element 50 of distributed resistance $R_o$ and distributed capacitance $C_o$, network input terminals 51, an input circuit lumped shunt capacitor 52 of capacitance C, a voltage amplifier 53 of positive gain $A_1$, and a feedback resistor 54 of resistance $R_f$. The output of the amplifier 53 is fed to the input of the network element 47 which is also of the type described with reference to FIG. 1, which network element includes a distributed RC element 60 of distributed resistance $R'_o$ and distributed capacitance $C'_o$, an input circuit lumped capacitor 62 of capacitance C', a voltage amplifier 63 of positive $A'_1$, and a feedback resistor 64 of resistance $R'_f$. The output of the amplifier 63 is fed to the input of the passive RC network element 48, which network element includes a series resistor 66 of resistance $R_p$ and a capacitor 67 of capacitance $C_p$ connected in shunt with output terminals 68 of the network of FIG. 8.

The first normalized factor realized by the active RC network element 46, in FIG. 8 is:

$$\frac{V_2}{V_1}=\frac{s^2+1}{2.785s^2+0.814s+0.501}$$

where $s^2$=0.359$p^2$ has been substituted for purposes of normalization, $V_1$ is the network input voltage across the input terminals 51, and $V_2$ is the output voltage of the network element 46 (output voltage of the voltage amplifier 53). The poles of this function are at −0.146±$j$ 0.398, and location of the point $\sigma$=0.146, $\omega$=0.398 on the plot of FIG. 2 gives the required values of $A_1$=1.11 and $C$=0.14 fd. Transformation back to the $p$ variable is accomplished by dividing all capacitances by 1.67, so that the unscaled values for the network element 46 are:

$R_f$=1.100Ω
$R_o$=17.8Ω
$C_1$=0.376 fd, and
$C$=0.084 fd.

The next normalized factor, realized by the active RC network element 47, in FIG. 8 is:

$$\frac{V'_2}{V'_1}=\frac{s^2+1}{1.355s^2+0.133s+0.808}$$

where $s^2$=0.738$p^2$ has been substituted for purposes of normalization, $V'_1$ is the input voltage to the network element 47 (output voltage of the amplifier 53), and $V'_2$ is the output voltage of the network element 47 (output voltage of the amplifier 63).

The poles of this function are at 00.049±$j$ 0.77, and location of the point $\sigma$=−0.049, $\omega$=0.77 on the plot of FIG. 2 gives the required values of $A'_1$ =1.03 and C'=0.023. Transformation back to the $p$ variable is accomplished by dividing all capacitances by 1.164, so that the unscaled values for the network element 47 are:

$R'_f$=1.00 Ω
$R'_o$=17.8 Ω
$C'_o$=0.540 fd, and
$C'$=0.020 fd.

The third normalized factor, realized by the passive RC network element 48 is $$\frac{V''_2}{V''_1}=\frac{0.416}{p+0.416}$$

where $V''_1$ is the input voltage to the network element 48 (output voltage of the amplifier 63), and $V''_2$ is the network output voltage across the output terminals 68.

In order to obtain the $\sigma$-axis zero at $\sigma$=−0.416, the unscaled values for the network element 48 are:

$C_p$=1.00 fd, and
$R_p$=2.40 Ω

The final network of FIG. 8 is obtained by cascading the subnetworks 46, 47 and 48. To bring the capacitance values in the separate networks closer together, an impedance scaling factor can be applied independently to each of these subnetworks. For example, a more convenient network could be obtained by scaling the impedances in the subnetwork 48 by a factor of 10, in which case $R_p$ would be 24.0 Ω and $C_p$ would be 0.100 fd. If the network of FIG. 8 is to be used with varying source and load impedances, two additional emitter followers would normally be added. In order to do this without zero offset, it is convenient to use an NPN emitter follower at the input and a PNP emitter follower at the output.

Figure 9:
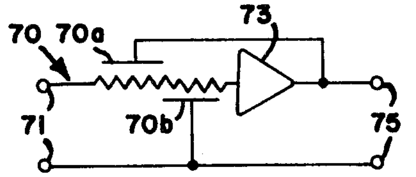
FIG. 9 is a schematic circuit diagram of another form of active RC network in accordance with the present invention.

In the active RC met FIG. 9, a distributed RC element 70 is divided into two sections, 70*a* and 70*b*. The resistive part of element 70 is connected in series with network input terminals 71 and the capacitive part of section 70*b* of the distributed element 70 is connected in shunt with the terminals 71 to form a passive RC input circuit for a positive gain voltage amplifier 73. Part of the output of the voltage amplifier 73 is connected directly to the conducting film of section 70*a* of the distributed element 70 which is capacitively coupled to the input of the amplifier 73, to thereby generate positive feedback for the amplifier 73. The output of amplifier 73 provides the output signal for output terminals 75 of the active RC network. The embodiment of FIG. 9 is similar to the embodiment of FIG. 5, except that the addition of the second section of the RC line increases the cutoff slope and thereby provides a response approximating a 4-pole low-pass circuit.

Figure 10:
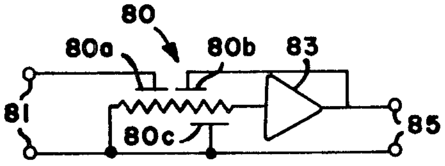
FIG. 10 is a schematic circuit diagram of another form of active RC network in accordance with the present invention.

In the active RC network embodiment of FIG. 10, a distributed RC element 80 is divided into sections, 80*a*, 80*b* and 80*c*. The series resistive part of the element 80 is capacitively coupled through section 80*a* with network input terminals 81 and the capacitive part of section 80*c* is connected in shunt to form a passive RC input circuit for a positive-gain voltage amplifier 83. Part of the output of the voltage amplifier 83 is connected directly to the conducting film of the section 80*b* which is capacitively coupled to the input of the amplifier 83, to thereby generate positive feedback for the amplifier 83. The output of the amplifier 83 provides the output signal for output terminals 85 of the active RC network. In this network, one zero is located at $\omega=0$ and another zero is located at $\omega=\infty$, to provide a second order band-pass function of high Q. The capacity distribution determines the gain required for a given Q. The gain decreases as the capacitance of the feedback section 80*b* of line 80 is increased and as the capacitance of the shunt section 80*c* is decreased.

Figure 11:
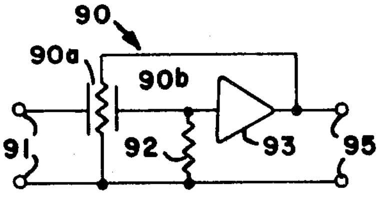
FIG. 11 is a schematic circuit diagram of still another form of active RC network in accordance with the present invention.

A still further embodiment of an active RC element in accordance with the present invention is shown in FIG. 11. A distributed RC element 90 is formed in two sections 90*a* and 90*b* with a common resistive portion. This would be accomplished by providing successive dielectric and conducting layers on each side of the resistive layer of the element 90. The two portions 90*a* and 90*b* are connected as capacitors in series with network input terminals 91 and, together with a shunt resistor 92, form a passive RC input circuit for a positive-gain voltage amplifier 93. Part of the output of the voltage amplifier 93 is connected directly to the 2:1 part of the element 91 which is capacitively coupled to the input of the amplifier 93, to thereby generate positive feedback for the amplifier 83. This circuit provides a second-order high-pass filter.

The distributed RC elements in the various networks described above need not have a uniformly distributed resistance and capacitance per unit length. For example, if the resistance per unit length is tapered in an increasing sense from the input end to the output end of the distributed line, the required amplifier gain is reduced. Thus, for example, a unity gain voltage follower could be used for various pole positions if the resistance taper is used as a variable parameter. In the network of FIG. 5, a tapered line would produce a third-order response function which, for example, could be combined with an emitter follower to provide a very simple approximation to a third-order Butterworth low-pass filter.

Having thus described my invention, what I claim as new and desire to protect by Letters Patent is:

1. An active RC filter having conjugate poles of transmission independently positionable with respect to conjugate zeros of transmission comprising a positive gain voltage amplifier with an input and an output, first and second input terminals, first and second output terminals, said output of said amplifier being connected to said first output terminal, said second input terminal being connected to said second output terminal, a distributed RC network having one resistance and one capacitance, said resistance being connected between said first input terminal and said amplifier input, a resistor connected between said amplifier output and one electrode of said capacitance in said RC network, and an impedance connected between said amplifier input and said second input terminal.

2. An active RC filter having conjugate poles of transmission independently positionable with respect to conjugate zeros of transmission comprising first and second input terminals, a positive gain voltage amplifier with an input and an output, first and second output terminals, said second input terminal being connected to said second output terminal, said amplifier output being connected to said first output terminal, a distributed RC network having a resistance and a capacitance, said resistance being connected between said first input terminal and said amplifier input, a resistor connected between said amplifier output and an electrode of said RC network capacitance, and an impedance connected between said amplifier input and said second input terminal, said conjugate zeros being on the $j\omega$ axis and the position of said poles with respect to said zeros being a function of said impedance and a function of the gain of said amplifier.

3. An active RC filter having conjugate $j\omega$ axis zeros and conjugate poles in the left half of the $p$ plane comprising a positive gain voltage amplifier having an input and an output, first and second input terminals, first and second output terminals, said second input terminal being connected to said second output terminal, said amplifier output being connected to said first output terminal, a three-terminal distributed RC network comprising a resistance and a capacitance, a first resistor having two terminals, one terminal of said first resistor being connected to said output of said amplifier, said terminals of said distributed RC network being connected to said first input terminal, said amplifier input and said second terminal of said first resistor, respectively, a second resistor connected between said amplifier input and said second input terminal, the position of said poles in said $p$ plane being a function of the gain of said amplifier and a function of the resistance of said second resistor.

4. An active RC filter having conjugate $j\omega$ axis zeros and conjugate poles in the left-half of the $p$ plane comprising a positive gain voltage amplifier having an input and an output, first and second input terminals, first and second output terminals, said second input terminal being connected to said second output terminal, said amplifier being connected to said first output terminal, a three-terminal distributed RC network comprising a resistance and a capacitance, a resistor having two terminals, one terminal of said resistor being connected to said output of said amplifier, said terminals of said distributed RC network being connected to said first input terminal, said amplifier input and said second terminal of said resistor, respectively, a capacitor connected between said amplifier input and said second input terminal, the position of said poles in said $p$ plane being a function of the gain of said amplifier and a function of the capacitance of said capacitor.

5. An active RC filter having conjugate $j\omega$ axis zeros and conjugate poles in the left half of the $p$ plane comprising a positive gain voltage amplifier having an input and an output, first and second input terminals, first and second output terminals, said second input terminal being connected to said second output terminal, said amplifier output being connected to said first output terminal, a first resistor having two terminals, one of said first resistor terminals being connected to said first output terminal, a distributed RC network having a resistance and a capacitance, said resistance being connected between said first input terminal and said amplifier input, an electrode of said RC network capacitance being connected to said other terminal of said first resistor, a second resistor connected between said amplifier input and said second output terminal, the position of said poles with respect to said zeros being a function of the gain of said amplifier and a function of the resistance of said second resistor.

6. An active RC filter having conjugate $j\omega$ axis zeros and conjugate poles in the left half of the $p$ plane comprising a positive gain voltage amplifier having an input and an output, first and second input terminals, first and second output terminals, said second input terminal being connected to said second output terminal, said amplifier output being connected to said first output terminal, a resistor having first and second terminals, said first resistor terminal being connected to said first output terminal, a distributed RC network having a resistance and a capacitance, said resistance being connected between said first input terminal and said amplifier input, an electrode of said RC network capacitance being connected to said second terminals of said resistor, a capacitor connected between said amplifier input and said second output terminal, the location of said poles with respect to zeros being a function of the gain of said amplifier and a function of the capacitance of said capacitor.

7. An active RC filter comprising: an amplifier with an input and an output, first and second input terminals, first and second output terminals, said second input terminal being connected to said second output terminal, said output of said amplifier being connected to said first output terminal, a distributed RC network having one resistance and first, second and third capacitances, each capacitance being adjacent to different sections of said resistance, said resistance being connected between said second input terminal and said amplifier input, said first, second and third capacitances being connected to said first input terminal, said second input terminal and said amplifier output, respectively, said active RC filter providing a second-order band-pass function with a high Q.